US006768123B2

(12) United States Patent
Giering

(10) Patent No.: US 6,768,123 B2
(45) Date of Patent: Jul. 27, 2004

(54) APPARATUS FOR EXAMINING DOCUMENTS

(75) Inventor: Thomas Giering, Kirchseeon (DE)

(73) Assignee: Giesecke & Devrient GmbH, Munich (DE)

( * ) Notice: Subject to any disclaimer, the term of this patent is extended or adjusted under 35 U.S.C. 154(b) by 131 days.

(21) Appl. No.: 10/165,274

(22) Filed: Jun. 10, 2002

(65) Prior Publication Data

US 2002/0185609 A1 Dec. 12, 2002

(30) Foreign Application Priority Data

Jun. 8, 2001 (DE) ........................................ 101 27 836

(51) Int. Cl.[7] ................................................ G01J 21/62
(52) U.S. Cl. ................................................... 250/458.1
(58) Field of Search .......................... 250/458.1, 459.1, 250/461.1, 372, 559.16, 559.17

(56) References Cited

U.S. PATENT DOCUMENTS 5,973,839 A * 10/1999 Dorsel ........................ 359/599

FOREIGN PATENT DOCUMENTS

DE 197 01 513 A1 7/1998
DE 199 24 750 A1 10/2000

OTHER PUBLICATIONS

English translation of abstract of DE 199 24 750 (2 pages).*

* cited by examiner

*Primary Examiner*—Constantine Hannaher
*Assistant Examiner*—Timothy Moran
(74) *Attorney, Agent, or Firm*—Bacon & Thomas, PLLC

(57) ABSTRACT

The invention relates to an apparatus for examining documents, in particular documents of value, identification or security documents, having at least two detector units (1, 2, 3) for detecting light (16) emanating from a document (10) to be examined.

To increase reliability when examining luminescence, reflection and/or transmission properties of documents, a scattering element (5) is provided on which the light (16) emanating from the document (10) is scattered, the scattering element (5) and detector units (1, 2, 3) being disposed such that the scattered light can be detected by the detector units (1, 2, 3).

The scattering element (5) causes spatial mixture and homogenization of the light (16) emanating from the document (10) so as to greatly reduce any parallactic errors that occur in particular with detector units (1, 2, 3) disposed side by side.

23 Claims, 2 Drawing Sheets

FIG. 3
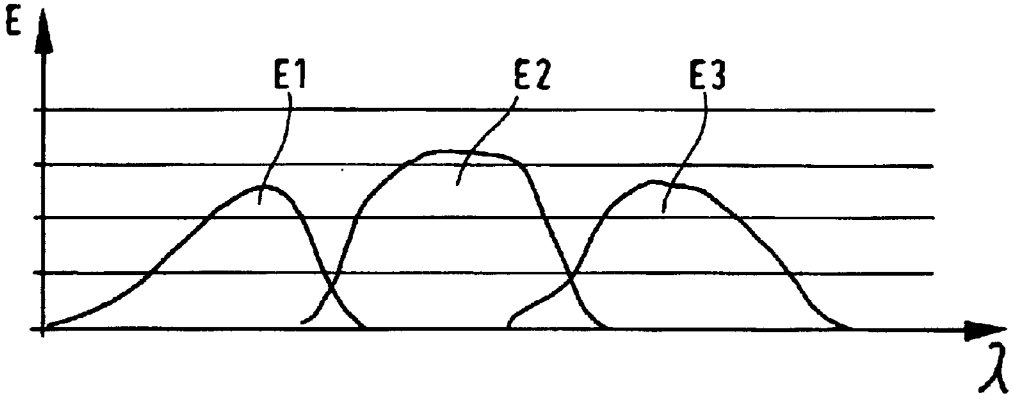
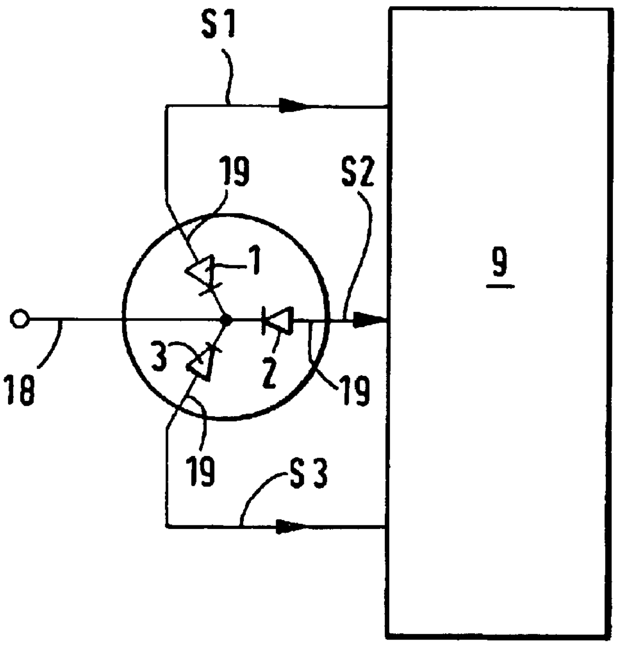
FIG. 4

APPARATUS FOR EXAMINING DOCUMENTS

BACKGROUND OF THE INVENTION

This invention relates to an apparatus for examining documents, in particular, documents of value, identification or security documents, having at least two detector units for detecting light emanating from a document to be examined.

To increase forgery-proofness, identification documents, security documents and documents of value, such as bank notes, are provided with security features or printed with suitable security inks.

Security features or security inks can contain luminescent substances that can be excited to glow e.g. by light, electric fields, radiation or sound. To check authenticity, the documents are excited to glow and the luminescence light emitted by the luminescent substances of the document is detected. With reference to the intensity and/or spectral characteristic of the luminescence light it can then be ascertained whether the document is authentic or counterfeit.

Certain security features or security inks are also distinguished by characteristic reflection and/or transmission behavior in certain spectral regions. If a document of value is imitated with the aid of a color copier, for example, usually only the visible color effect of a printed area can be reproduced. Since customary color particles do not have the spectral behavior in certain, in particular invisible, spectral regions that is characteristic of security features or inks, however, counterfeit documents can generally be recognized by corresponding measurement of their reflection and/or transmission behavior in said spectral regions.

The reliability of statements about the authenticity of the checked documents is highly dependent here on the accuracy with which the spectral characteristic, i.e. color, of the light emanating from a document is analyzed. Such analysis can be effected for example by spectrometers, but these require relatively high technical effort and high production costs.

A simpler solution is therefore to use individual detector units, such as photodiodes or photomultipliers, each with different spectral sensitivity. Depending on the the spectral characteristic of the light emanating from the document, the detector units deliver different detector signals which can then be used for spectral analysis of the light. Apparatuses of this type have the disadvantage, however, that the light detected by the various detector units generally does not come from exactly the same partial area of the document due to parallactic errors. This makes it impossible to reliably assess the color properties of the light emanating from a certain partial area of the document. This is of disadvantage in particular when areas with small extensions, such as individual lines of a printed image, are to be examined for their spectral properties, since in this case even small parallactic errors can lead to especially great inaccuracies in the spectral analysis of the light emanating from the document.

SUMMARY OF THE INVENTION

It is the problem of the invention to state an apparatus allowing higher reliability when examining the luminescence, reflection and/or transmission properties of documents, in particular documents of value, identification and security documents.

The problem is solved by providing a scattering element on which the light emanating from the document to be examined is scattered, the scattering element and detector units being disposed such that the scattered light can be detected by the detector units.

The invention is based on the idea of scattering the light emanating from different partial areas of the document by means of a scattering element whereby the light components emanating from the individual partial areas are mixed. Individual detector units disposed side by side can thus detect light having components from the different partial areas of the document. The scattering element causes spatial mixture and homogenization of the light emanating from the document.

The invention permits the detector units to detect the light emanating from a common area of the document equally well. Any parallactic errors which would occur with a laterally shifted assembly of detector units are greatly mitigated by the inventively provided scattering element. From the spectral components of the light emanating from the document detected by the individual detector units, statements about the spectral characteristic of the luminescence, reflection and/or transmission behavior of the document can then be derived with high reliability.

In a preferred embodiment of the invention, the scattering element is formed for diffuse transmission and/or diffuse reflection of the light emanating from the document. Diffuse transmission or reflection is intended to refer here to any substantially nondirected transmission or reflection.

BRIEF DESCRIPTION OF THE DRAWINGS

The invention will be explained in more detail in the following with reference to examples shown in figures, in which:

FIG. 3 shows an example of different spectral sensitivities of the detector units used in FIGS. 1 and 2; and FIG. 4 shows an example of a preferred electric circuit of the detector units used in FIGS. 1 and 2.

DETAILED DESCRIPTION OF THE PREFERRED EMBODIMENTS

Figure 1:
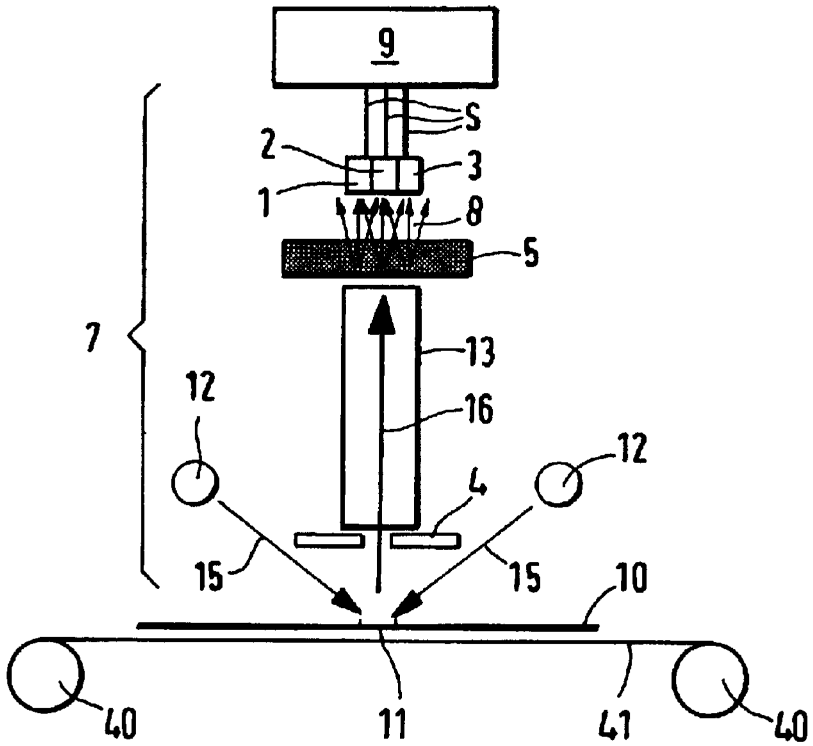
FIG. 1 shows a first embodiment of the invention.

FIG. 1 shows a first embodiment of the invention. A document to be examined, bank note 10 in the example shown, is transported past sensor system 7 by means of a transport device indicated by transport rollers 40 and transport belts 41. At the same time, bank note 10 is irradiated with light 15 from two light sources 12. Light sources 12 are for example fluorescent tubes, incandescent lamps, lasers or light-emitting diodes (LEDs).

In an embodiment of the invention it is provided that excitation light 15 emitted by particular light sources 12 is in different wavelengths or wave ranges. This permits even more exact statements about the properties of light 16 emanating from bank note 10. It may in particular be provided that light sources 12 illuminate bank note 10 either individually or in combination and light 16 detected when bank note 10 is illuminated individually or in combination is evaluated. If only one light source 12 is first used for illumination in the example of FIG. 1 shown, then detector units 1 to 3 detect three first intensity values. Upon subsequent illumination with other light source 12, three second intensity values are generated. Upon simultaneous illumination with both light sources 12, three third intensity values are finally obtained. Comparison and/or mathematical combination of the resulting, generally different, intensity values permits especially exact examination of the properties of light 16 emanating from examined bank note 10.

In case luminescence light is to be excited in or on bank note 10, light sources 12 emit light suitable for exciting luminescence light in or on bank note 10. Preferably, this is ultraviolet (UV) light. To eliminate spectral components at higher wavelengths, for example in the visible or infrared spectral region, corresponding filters (not shown) can be disposed before light sources 12.

For the case of application that the light diffusely reflected by bank note 10 in certain spectral regions is to be examined, light sources 12 are formed to emit light 15 with spectral components in said spectral regions.

In the shown example, the excitation of luminescence light 16 in or on bank note 10 is effected by light 15 from light sources 12. A corresponding luminescence phenomenon is therefore called photoluminescence. Alternatively or additionally, electric fields, radiation or sound can be used to excite other types of luminescence phenomena, such as electron, radio- or sonoluminescence, in or on bank note 10. Excitation is effected by corresponding excitation devices, such as electric contacts or field plates, radiation sources for cathode rays, ion beams or x-rays, ultrasonic sources or antennas. Depending on the decay time behavior, luminescence light can be distinguished as phosphorescence or fluorescence light.

Luminescence light 16 excited in or on bank note 10, or the light reflected by bank note 10, hits detector units 1 to 3 disposed side by side and is detected thereby. Detector units 1 to 3 have different spectral sensitivities and thus detect different spectral components of light 16 emanating from bank note 10. Accordingly, detector units 1 to 3 generate different detector signals S which are supplied to evaluation device 9 for evaluation and analysis.

In the shown example, first device 13 is provided between bank note 10 and detector devices 1 to 3 for directing, in particular focusing, light 16 emanating from bank note 10 onto detector units 1 to 3. This may be an imaging optic that images partial area 11 of bank note 10 onto detector devices 1 to 3. For this purpose, self-focusing lenses, so-called Selfoc lenses, are preferably used. Self-focusing lenses are cylindrical optical elements made of material having a refractive index decreasing from the optical axis of the cylinder to the surface thereof. The use of Selfoc lenses obtains an adjustment-free 1:1 image transfer of partial area 11 of bank note 10 to be examined onto detector units 1 to 3 independently of the distance of bank note 10 and detector units 1 to 3.

Alternatively or additionally, first device 13 can also have a light guide element, e.g. of one or more glass and/or plastic fibers. This has the advantage that detector units 1 to 3 can be disposed at any desired places, allowing especially compact integration of such apparatuses into bank note processing systems.

According to the invention, a scattering element formed as diffusing disk 5 on which light 16 emanating from bank note 10 is scattered is provided before individual detector units 1 to 3. The scatter results in the shown example from diffuse transmission of light 16 through diffusing disk 5. This process is indicated in the Figure by a plurality of small arrows 8.

A second device is provided between bank note 10 and detector units 1 to 3 for limiting the aperture and thus the size of partial area 11 examined on bank note 10. Aperture limitation is of advantage in particular when the spectral properties of small partial areas of bank note 19, for example thin lines or details of a printed image, are to be examined. In the shown example, the second device has diaphragm 4, in particular a pin or slit diaphragm. Together with first device 13 formed as a Selfoc lens, especially simple and precise aperture limitation is obtained. A plurality of alternative embodiments of aperture limitation are fundamentally possible, for example combining diaphragm 4 with a light guide element, e.g. based on glass and/or plastic fibers, or combining a light guide element with an imaging optic that images partial area 11 of bank note 10 to be examined onto the light guide element, in particular into a glass and/or plastic fiber.

Figure 2:
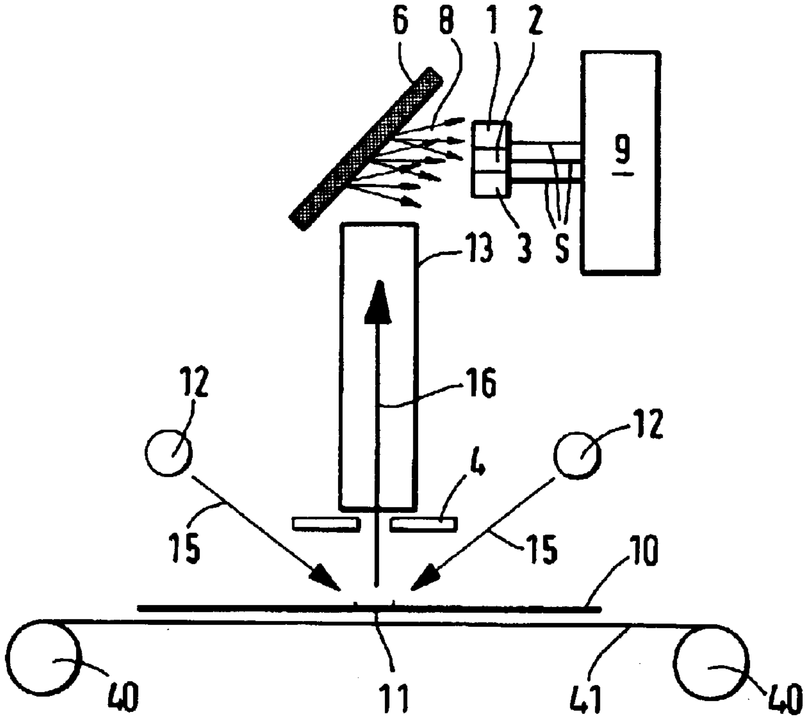
FIG. 2 shows a second embodiment of the invention.

FIG. 2 shows a second embodiment of the invention wherein, in contrast to the embodiment shown in FIG. 1, reflector 6 is used instead of diffusing disk 5 as a scattering element. Light 16 emanating from bank note 10 is diffusely reflected on reflector 6, for example a matt or rough mirror, and then detected by individual detector units 1 to 3 disposed side by side. The functionality of all other components of the apparatus is analogous to the example described in FIG. 1.

As an alternative to the scattering elements formed as diffusing disk 5 or reflector 6, an Ulbricht sphere can also be used for scattering light 16 emanating from bank note 10. This is a hollow sphere whose interior is provided with a diffusely reflecting coating, for example of magnesium oxide, barium sulfate or Teflon. Light 16 emanating from bank note 10 enters a first opening in the Ulbricht sphere, is diffusely reflected many times in its inside and exits through another opening. The passage of light directly from the entry to the exit openings is prevented by corresponding additional means inside the sphere, e.g. reflectors. The diffuse light leaving the Ulbricht sphere can then be detected by detector units 1 to 3.

A further possibility for spatially mixing light 16 emanating from bank note 10 is offered by a scattering element formed as a hologram in which light beams emanating from bank note 10 are split into a plurality of light beams of different direction and thus mixed before hitting the detector units.

An optical filter (not shown) can be disposed before scattering element 5 or 6, said filter being permeable e.g. only to those spectral components of light 16 emanating from bank note 10 which are to be detected by detector units 1 to 3 disposed behind scattering element 5 or 6.

In a further alternative embodiment of the invention it is provided that the scattering element includes first device 13 and/or the second device, in particular diaphragm 4. Preferably, the first and/or second devices contain light-scattering particles on which light 16 emanating from bank note 10 is scattered. In this embodiment, the scattering element can be formed by the first and/or second device, so that separate scattering element 5 or 6 can possibly be dispensed with.

Detector units 1 to 3 are preferably formed as photodiodes, which can be integrated on a common semiconductor substrate. This obtains an especially dense arrangement of detector units 1 to 3 side by side, so that any parallactic errors can be greatly reduced. Especially suitable and commercially available three-color sensors (e.g. types MCS3AT/BT or MCSi from the company MAZeT GmbH, D-07745 Jena) are constructed from three Si-PIN photodiodes integrated on a chip and executed as segments of a circle or hexagon with typical diameters between about 0.07 millimeters and 3 millimeters. To obtain low crosstalk between the photodiodes, the individual segments are separated from each other by additional structures. Each of the photodiodes is sensitized with a corresponding dielectric color filter to a different color range, in particular to the primary colors, red, green and blue.

Alternatively, detector units 1 to 3 can be disposed along a line or on one plane so as to form a one- or two-dimensional detector array, in particular a photodiode array (PDA).

Types of detectors other than photodiodes are also suitable for detecting light 16, for example photomultipliers.

FIG. 3 shows an example of different spectral sensitivities E of detector units 1 to 3 used in FIGS. 1 and 2. Sensitivities E are plotted over wavelength λ. As indicated by the diagram, spectral sensitivities E1, E2 and E3 of the individual detector units are in substantially separate spectral regions. Depending on the type of analysis of the spectral characteristic of light emanating from a document, the spectral position and spectral course of individual sensitivities E1 to E3 can be accordingly selected. Spectral sensitivities E1, E2 and E3 are preferably in the blue, green and red spectral regions, respectively. Depending on the case of application, individual sensitivities E1 to E3 can also be in invisible spectral regions, such as the infrared or ultraviolet. Sensitivity curves EB to E3 of individual detector units 1 to 3 can of course overlap at least partly, and output signals S1 to S3 of the detector units be used to determine color values of the document to be examined.

In a further embodiment of the invention, sensitivity curves E1 to E3 of individual detector units 1 to 3 overlap over a wide spectral region, in particular over the total spectral region examined, the maxima or mean values of particular sensitivities E1 to E3 being in different wavelengths or wave ranges. This can be realized in a simple realized in a simple way e.g. if detector units 1 to 3 have three photodiodes with preferably the same sensitivity curve and sensitive over the total spectral region examined, at least two of the photodiodes being provided with optical filters of different permeability in a wide spectral region. The individual photodiodes thus detect the intensity of light 16 emanating from bank note 10 at different wavelengths or wave ranges. From the detected intensities, statements can then be made about the spectral properties of detected light 16. The spectral transmission curves of the filters are preferably selected such that in particular their ratio is a unique function of the wavelength in the relevant, i.e. examined, spectral region.

The spectral properties of detected visible or invisible light 16 refer in connection with the invention not only to its color but in particular also to the wavelength, such as the central wavelength, and/or the wave range.

FIG. 4 shows a preferred circuit of detector units 1 to 3 used in FIGS. 1 and 2, in particular when using one of the above-described commercial three-color sensors. Detector units 1 to 3 formed as photodiodes are switched here so that their cathode outputs are on common potential 18 and their anode outputs 19 are connected with evaluation device 9. In evaluation device 9 statements about the spectral properties, in particular the wavelength, such as the central wavelength, and/or the wave range and/or the color, of detected light 16 can then be derived from detector signals S1 to S3 of the photodiodes.

What is claimed is:

1. An apparatus for examining documents, comprising at least two detector units arranged to detect light emanating from a document to be examined, wherein at least one scattering element is provided on which the light emanating from a document to be examined is scattered, and the scattering element and detector units are disposed such that the scattered light can be detected by the detector units; and wherein the detector units have different spectral sensitivities.

2. Apparatus according to claim 1, wherein the scattering element is formed for diffuse transmission and/or diffuse reflection of the light emanating from a document to be examined.

3. Apparatus according to claim 2, wherein the scattering element is formed as a diffusing disk on which the light emanating from a document to be examined is diffusely transmitted and/or diffusely reflected.

4. Apparatus according to claim 2, wherein the scattering element is formed as a reflector comprising a mirror with a matte surface, on which the light emanating from a document to be examined is diffusely reflected.

5. Apparatus according to claim 1, wherein the scattering element is formed as an Ulbricht sphere.

6. Apparatus according to claim 1, wherein the scattering element is formed as a hologram that splits light beams emanating from the document into a plurality of light beams of different direction.

7. Apparatus according to claim 1, wherein the detector units are formed as photodiodes.

8. Apparatus according to claim 1, wherein the detector units are integrated side by side on a common semiconductor substrate.

9. Apparatus according to claim 1, wherein at least one detector unit has an optical filter.

10. Apparatus according to claim 1, including an excitation device formed to excite luminescence light in or on the document to be examined, and wherein the detector units are arranged to detect at least part of the luminescence light emanating from a document to be examined.

11. Apparatus according to claim 10, wherein the excitation device includes at least one light source arranged to illuminate a document to be examined with light suitable for exciting luminescence light in or on the document.

12. Apparatus according to claim 1, including at least one light source arranged to illuminate a document to be examined, and wherein the detector units are formed to detect at least part of the light diffusely reflected, preferably, and/or transmitted by a document to be examined.

13. Apparatus according to claim 1, wherein at least a first device is provided for directing the light emanating from a document to be examined onto the detector units.

14. Apparatus according to claim 13, wherein the first device includes at least one self-focusing lens, for focusing the light emanating from a document to be examined.

15. Apparatus according to claim 13, wherein the first device includes at least one light guide element comprising glass and/or plastic fibers, arranged to direct the light emanating from a document to be examined onto the detector units.

16. Apparatus according to claim 13, including a second device disposed between a document to be examined and the detector units and arranged to limit the aperture.

17. Apparatus according to claim 16, wherein the second device has a diaphragm.

18. Apparatus according to claim 16, wherein the scattering element includes the first device and/or the second device.

19. Apparatus according to claim 18, wherein the first device and/or the second device contain light-scattering particles on which the light emanating from a document to be examined is scattered.

20. Apparatus according to claim 16, wherein the scattering element includes the first device and/or the second device.

21. Apparatus according to claim 1, including an evaluation device arranged to derive statements about the spectral properties; preferably the wavelength, such as the central wavelength, and/or the wave range and/or the color, of the light emanating from a document to be examined from detector signals generated by the detector units.

22. Apparatus according to claim 1, wherein the detector units are disposed along a line or on one plane.

23. Apparatus according to claim 1, including a second device disposed between a document to be examined and the detector units and arranged to limit the aperture.

* * * * *